(12) United States Patent
Rautschek et al.

(10) Patent No.: US 7,619,043 B2
(45) Date of Patent: Nov. 17, 2009

(54) ANTI-FOAM COMPOSITIONS

(75) Inventors: Holger Rautschek, Nuenchritz (DE);
Richard Becker, Burghausen (DE);
Willibald Burger, Burghausen (DE)

(73) Assignee: Wacker Chemie AG, Munich (DE)

( * ) Notice: Subject to any disclaimer, the term of this patent is extended or adjusted under 35 U.S.C. 154(b) by 279 days.

(21) Appl. No.: 11/570,151

(22) PCT Filed: Aug. 4, 2005

(86) PCT No.: PCT/EP2005/008462

§ 371 (c)(1),
(2), (4) Date: Dec. 7, 2006

(87) PCT Pub. No.: WO2006/018145

PCT Pub. Date: Feb. 23, 2006

(65) Prior Publication Data

US 2008/0021152 A1  Jan. 24, 2008

(30) Foreign Application Priority Data

Aug. 19, 2004 (DE) .................. 10 2004 040 263

(51) Int. Cl.
C08L 83/04 (2006.01)

(52) U.S. Cl. .............. 525/477; 525/474; 524/261; 524/267; 524/268; 524/588; 524/858; 524/860; 524/861; 524/863; 516/117; 516/123

(58) Field of Classification Search .............. 524/261
See application file for complete search history.

(56) References Cited

U.S. PATENT DOCUMENTS

| | | | |
|---|---|---|---|
| 2,632,736 A | 3/1953 | Currie et al. | |
| 3,383,327 A | 5/1968 | Sullivan et al. | |
| 3,560,401 A | 2/1971 | O'Hara et al. | |
| 4,145,308 A | 3/1979 | Simoneau et al. | |
| 4,477,371 A * | 10/1984 | Huber et al. | 516/121 |
| 4,584,125 A | 4/1986 | Griswold et al. | |
| 4,741,861 A | 5/1988 | Okada et al. | |
| 4,919,843 A | 4/1990 | Innertsberger et al. | |
| 5,082,590 A * | 1/1992 | Araud | 516/121 |
| 5,223,596 A * | 6/1993 | Okawa et al. | 528/15 |
| 5,486,306 A * | 1/1996 | L'Hostis et al. | 516/117 |
| 6,197,914 B1 | 3/2001 | Kaeppler et al. | |
| 6,521,587 B1 * | 2/2003 | L'Hostis et al. | 510/466 |
| 6,605,183 B1 | 8/2003 | Rautschek et al. | |

FOREIGN PATENT DOCUMENTS

| | | |
|---|---|---|
| DE | 1 519 987 | 4/1970 |
| DE | 1 769 940 | 3/1972 |
| DE | 25 51 260 A1 | 5/1977 |
| DE | 29 25 722 A1 | 2/1981 |
| DE | 199 22 915 A1 | 11/2000 |
| EP | 0 121 210 A1 | 10/1984 |
| EP | 0 273 448 A2 | 7/1988 |
| EP | 0 301 531 A2 | 2/1989 |
| EP | 0 434 060 A2 | 6/1991 |
| EP | 0 663 225 A1 | 7/1995 |
| EP | 0 887 097 A1 | 12/1998 |
| EP | 0 927 733 A1 | 7/1999 |
| EP | 1 060 778 A1 | 12/2000 |
| EP | 1 075 863 A2 | 2/2001 |
| EP | 1 076 073 A1 | 2/2001 |
| JP | 60-173068 | 9/1985 |
| WO | WO-2004/018074 A1 | 3/2004 |

* cited by examiner

Primary Examiner—David Wu
Assistant Examiner—Vu Nguyen
(74) Attorney, Agent, or Firm—Brooks Kushman P.C.

(57) ABSTRACT

Defoaming compositions employing organopolysiloxanes bearing aryl radicals exhibit surprising efficiency relative to their alkyl counterparts.

16 Claims, No Drawings

ANTI-FOAM COMPOSITIONS

CROSS-REFERENCE TO RELATED APPLICATION

This application is the U.S. national phase of PCT Appln. No. PCT/EP2005/008462 filed Aug. 4, 2005, which claims priority to German application 10 2004 040 263.9 filed Aug. 19, 2004.

BACKGROUND OF THE INVENTION

1. Field of the Invention

The invention relates to compositions which comprise organic compounds having aromatic radicals attached directly to the silicon atom and to their use as defoamers.

2. Description of the Related Art

In many liquid systems which include surface-active compounds as desired or as unwanted constituents, especially in aqueous systems, it is possible for problems to occur as a result of foaming if these systems are contacted more or less intensively with gaseous substances, such as during the gassing of wastewaters, during the intensive stirring of liquids, during distillation, washing or coloring operations or during dispensing processes, for example.

This foam can be controlled by mechanical means or through the addition of defoamers. Siloxane-based defoamers have proven particularly appropriate.

Siloxane-based defoamers are prepared in accordance with DE-B 15 19 987, for example, by heating hydrophilic silica in polydimethylsiloxanes. Using basic catalysts allows the effectiveness of such defoamers to be improved, as disclosed in DE-A 17 69 940, for instance. An alternative is to disperse hydrophobicized silica in a polydimethylsiloxane, in accordance for example with DE-A 29 25 722. Nevertheless, the effectiveness of the resulting defoamers is still in need of improvement. Thus U.S. Pat. No. 4,145,308, for example, describes a defoamer preparation which in addition to a polydiorganosiloxane and silica further comprises a copolymer made up of $(CH_3)_3SiO_{1/2}$ and $SiO_2$ units. Copolymers made up of $(CH_3)_3SiO_{1/2}$ and $SiO_2$ units are also said to be advantageous in combination with siloxanes which carry terminal long alkyl groups, as described for instance in EP-A 301 531. The use of partly crosslinked polydimethylsiloxanes which are in some cases already rubberlike is said to contribute to increasing the defoamer effect. On this point reference may be made, for example, to U.S. Pat. No. 2,632,736, EP-A 273 448 and EP-A 434 060. These products, though, are generally of very high viscosity and are difficult to handle or to process further.

Generally, use is made of polysiloxanes having methyl groups, such as polydimethylsiloxanes. Although polymers with a range of other aliphatic or aromatic hydrocarbon groups on the silicon are known and are also proposed in numerous patents for the preparation of defoamers, there is little indication that by selecting the substituents on the silicon it is possible to achieve a substantial improvement in the defoaming effect. Frequently the aim of introducing long alkyl groups or polyether substituents is to improve the compatibility with mineral oils that may be present in defoamer compositions, or to prevent silicone defects in coatings, for example. Thus EP-A 121 210 recommends the use of polysiloxanes which carry alkyl groups having 6-30 carbon atoms, so that the fraction of carbon in the form of the $CH_2$ group is 30%-70%, in combination with mineral oil. In the examples, mention is made in particular of polysiloxanes having octadecyl groups. JP-A 60173068 recommends siloxanes having octyl groups and polyether groups as defoamers in aqueous printing inks. Siloxanes having alkyl groups with more than 30 carbon atoms in combination with amino siloxanes are said by U.S. Pat. No. 4,584,125 to be advantageous for the antifoam effect especially when the fraction of siloxane units carrying these moieties is around 5%.

In strongly foaming, surfactant-rich systems, however, the defoamer formulations prepared in accordance with the prior art do not always have a sufficiently long-lasting effectiveness or else, owing to the high viscosity, because of the degree of branching or crosslinking that is achieved, are difficult to handle.

SUMMARY OF THE INVENTION

It has now been surprisingly discovered that multiple component defoamers having Si—C aryl substituted organopolysiloxanes provide efficient and long lasting foam control.

DETAILED DESCRIPTION OF THE PREFERRED EMBODIMENTS

The invention provides compositions comprising (A) at least one organosilicon compound which has units of the formula

$$R_a(R^1O)_bR^2_cSiO_{(4-a-b-c)/2} \qquad (I)$$

in which

R can be identical or different and denotes hydrogen atom, a monovalent, SiC-bonded, optionally substituted, aliphatic hydrocarbon radical or an aromatic hydrocarbon radical attached to the silicon atom via aliphatic groups, $R^1$ can be identical or different and denotes hydrogen atom or a monovalent, optionally substituted hydrocarbon radical, $R^2$ can be identical or different and denotes a monovalent, optionally substituted, aromatic hydrocarbon radical which is attached to the silicon atom via a carbon ring atom, a is 0, 1, 2 or 3, b is 0, 1, 2 or 3 and c is 0, 1, 2 or 3, with the proviso that the sum a+b+c is less than or equal to 3, and in 1-100%, preferably in 10-60%, more preferably in 20-40% of all units of the formula (I) per molecule, c is other than 0, and in at least 50% of all of the units of the formula (I) in the organosilicon compound the sum a+b+c is 2, (B) at least one additive selected from (B1) filler particles and/or (B2) organopolysiloxane resin containing units of the formula

$$R^3_d(R^4O)_eSiO_{(4-d-e)/2} \qquad (II)$$

in which $R^3$ can be identical or different and denotes hydrogen atom or a monovalent, optionally substituted, SiC-bonded hydrocarbon radical, $R^4$ can be identical or different and denotes hydrogen atom or a monovalent, optionally substituted hydrocarbon radical, d is 0, 1, 2 or 3 and e is 0, 1, 2 or 3, with the proviso that the sum d+e≦3 and in less than 50% of all of the units of the formula (II) in the organopolysiloxane resin the sum d+e is 2, and optionally (C) an organosilicon compound which has units of the formula

$$R^5_g(R^6O)_hSiO_{(4-g-h)/2} \qquad (III)$$

in which

R⁵ can be identical or different and has a meaning given for R,

R⁶ can be identical or different and has a meaning given for R¹, g is 0, 1, 2 or 3 and h is 0, 1, 2 or 3, with the proviso that the sum g+h≦3 and in at least 50% of all of the units of the formula (IV) in the organosilicon compound the sum g+h is 2.

For the present invention it is essential that component (A) comprises aromatic radicals attached directly to the silicon atom. This means that there is a covalent bond between a silicon atom in the unit of the formula (I) and a carbon atom belonging to the aromatic ring.

Examples of radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals such as the cyclopentyl, cyclohexyl, cycloheptyl and methylcyclohexyl radicals, and aromatic groups attached via aliphatic groups to the silicon atom, such as the benzyl radical, phenylethyl radical or the 2-phenylpropyl radical.

Examples of substituted radicals R are the 3,3,3-trifluoro-n-propyl, cyanoethyl, glycidyloxy-n-propyl, polyalkylene glycol-n-propyl, amino-n-propyl, aminoethylamino-n-propyl, and methacryloyloxy-n-propyl radicals.

Preferably radical R comprises a hydrogen atom or an optionally substituted, aliphatic hydrocarbon radical having 1 to 30 carbon atoms, more preferably an aliphatic hydrocarbon radical having 1 to 4 carbon atoms, and in particular the methyl radical.

Examples of radical R¹ are hydrogen atom and the radicals indicated for radical R and R².

Preferably radical R¹ comprises a hydrogen atom or an optionally substituted hydrocarbon radical having 1 to 30 carbon atoms, more preferably hydrogen atom or hydrocarbon radicals having 1 to 4 carbon atoms, especially methyl or ethyl radicals.

Examples of R² are aryl radicals, such as phenyl, tolyl, xylyl, cumyl, naphthyl and anthracyl radicals. Radical R² is preferably the phenyl radical. Radical R² is preferably 10 to 100%, more preferably 15 to 50%. of the SiC-bonded radicals in component (A).

Preferably b is 0 or 1, more preferably 0.

Preferably c is 0, 1 or 2.

Preferably, less than 5%, especially less than 1%, of the radicals R are hydrogen atom.

The organosilicon compounds containing units of the formula (I) that are used as component (A) are preferably branched or linear organopolysiloxanes which more preferably are composed substantially or fully of units of the formula (I).

In the context of the present invention the term "organopolysiloxanes" is intended to embrace polymeric, oligomeric and dimeric siloxanes.

Examples of the component (A) of the invention are those comprising units $Ph_3SiO_{1/2}$—, $Ph_2MeSiO_{1/2}$—, $PhMe_2SiO_{1/2}$—, $Ph_2SiO_{2/2}$—, $PhMeSiO_{2/2}$— and $PhSiO_{3/2}$—, where Me denotes methyl radical and Ph denotes phenyl radical, such as, for example, linear polysiloxanes of the formulae
$Me_3SiO(Ph_2SiO)_x(Me_2SiO)_zSiMe_3$,
$Me_3SiO(PhMeSiO)_y(Me_2SiO)_zSiMe_3$,
$Me_3SiO(Ph_2SiO)_x(PhMeSiO)_y(Me_2SiO)_zSiMe_3$, and
$Me_3SiO(Ph_2SiO)_x(Me_2SiO)_zSiMe_3$, and also branched polysiloxanes of the formulae
$MeSi[O(Ph_2SiO)_x(Me_2SiO)_zSiMe_3]_3$,
$PhSi[O(PhMeSiO)_y(Me_2SiO)_zSiMe_3]_3$, and
$Me_3SiO(Me_2SiO)_z[PhSiO(OMe_2SiO)_zSiMe_3]_v(Me_2SiO)_zSiMe_3$, the coefficients v, x, and y independently of one another adopting values greater than or equal to 1, and z being 0 or greater than or equal to 1. The sum of v, x, y, and z determines the degree of polymerization, v the number of branches, and hence the viscosity.

The organosilicon compounds (A) of the invention have a viscosity of preferably 10 to 1,000,000 mPas, more preferably from 100 to 50,000 mPas and in particular from 500 to 5,000 mPas, measured in each case at 25° C.

The organosilicon compounds (A) of the invention are commercially available products or can be prepared by known methods of organosilicon chemistry, such as, for example, by cohydrolysis of the corresponding silanes.

The compositions of the invention preferably comprise additive (B) in amounts of 0.1 to 30 parts by weight, more preferably 1 to 15 parts by weight, based in each case on 100 parts by weight of component (A).

Additive (B) employed in accordance with the invention may comprise exclusively component (B1), exclusively component (B2) or a mixture of components (B1) and (B2), the latter being preferred.

Component (B1) preferably comprises pulverulent fillers, more preferably pulverulent hydrophobic fillers.

Preferably component (B1) has a BET surface area of 20 to 1000 m²/g, a particle size of less than 10 μm and an agglomerate size of less than 100 μm.

Examples of component (B1) are silicon dioxide (silicas), titanium dioxide, aluminum oxide, metal soaps, quartz flour, PTFE powders, fatty acid amides, ethylenebisstearamide for example, and finely divided hydrophobic polyurethanes.

As component (B1) it is preferred to use silicon dioxide (silicas), titanium dioxide or aluminum oxide having a BET surface area of 20 to 1000 m²/g, a particle size of less than 10 μm and an agglomerate size of less than 100 μm.

Of particular preference as component (B1) are silicas, particularly those having a BET surface area of 50 to 800 m²/g. These silicas may be pyrogenic or precipitated silicas+. As component (B1) it is possible to use both pretreated silicas, i.e., commercially customary hydrophobic silicas, and hydrophilic silicas.

Examples of hydrophobic silicas which can be used in accordance with the invention are HDK® H2000, a pyrogenic, hexamethyldisilazane-treated silica having a BET surface area of 140 m²/g (available commercially from Wacker-Chemie GmbH, Germany) and a precipitated, polydimethylsiloxane-treated silica having a BET surface area of 90 m²/g (available commercially under the name "Sipernat® D10" from Degussa AG, Germany).

If hydrophobic silicas are to be used as component (B1), it is also possible to hydrophobicize hydrophilic silicas in situ, if to do so is advantageous for the desired effectiveness of the defoamer formulation. There are many known methods of hydrophobicizing silicas. The hydrophilic silica can be hydrophobicized in situ by, for example, heating the silica in dispersion in component (A) or in a mixture of (A) with (B2) and/or (C) at temperatures of 100 to 200° C. for a number of hours. This reaction can be assisted by the addition of catalysts, such as KOH, and of hydrophobicizers, such as short-chain OH-terminated polydimethylsiloxanes, silanes or silazanes. This treatment is also possible when using commercially customary hydrophobic silicas, and may contribute to improved effectiveness.

Another possibility is to use a combination of silicas hydrophobicized in situ with commercially customary hydrophobic silicas.

Examples of radical $R^3$ are hydrogen atom and the radicals indicated for radical R and $R^2$.

Preferably $R^3$ comprises optionally substituted hydrocarbon radicals having 1 to 30 carbon atoms, more preferably hydrocarbon radicals having 1 to 6 carbon atoms, and in particular the methyl radical.

Examples of radical $R^4$ are the radicals indicated for the radical $R^1$.

Radical $R^4$ preferably comprises a hydrogen atom or a hydrocarbon radical having 1 to 4 carbon atoms, preferably a hydrogen atom, methyl radical or ethyl radical.

Preferably the value of d is 3 or 0.

Component (B2) used optionally in accordance with the invention preferably comprises silicone resins made up of units of the formula (II) for which in less than 30%, preferably in less than 5%, of the units in the resin the sum d+e is 2.

With particular preference component (B2) comprises organopolysiloxane resins composed essentially of $R^3{}_3SiO_{1/2}$ (M) and $SiO_{4/2}$ (Q) units with $R^3$ the same as the abovementioned definition; these resins are also called MQ resins. The molar ratio of M to Q units is preferably in the range from 0.5 to 2.0, more preferably in the range from 0.6 to 1.0. These silicone resins may additionally contain up to 10% by weight of free hydroxyl or alkoxy groups.

Preferably these organopolysiloxanes (B2) have a viscosity at 25° C. of more than 1000 mPas or are solids. The weight-average molecular weight determined by gel permeation chromatography (relative to a polystyrene standard) of these resins is preferably 200 to 200,000 g/mol, in particular 1000 to 20,000 g/mol.

Component (B2) are available commercially or can be prepared by methods common in silicon chemistry, in accordance for example with EP-A 927 733.

Where additive (B) used in accordance with the invention comprises a mixture of components (B1) and (B2), the weight ratio of (B1) to (B2) in the mixture is preferably 0.01 to 50, more preferably 0.1 to 7.

Examples of radicals $R^5$ are the examples indicated for radical R.

Preferably radical $R^5$ comprises hydrogen atom or optionally substituted, aliphatic hydrocarbon radicals having 1 to 30 carbon atoms, more preferably aliphatic hydrocarbon radicals having 1 to 4 carbon atoms, and especially the methyl radical.

Examples of radical $R^6$ are hydrogen atom and the radicals indicated for radical R and $R^2$.

Preferably radical $R^6$ comprises a hydrogen atom or an optionally substituted hydrocarbon radical having 1 to 30 carbon atoms, more preferably a hydrogen atom or a hydrocarbon radical having 1 to 4 carbon atoms, and especially, a methyl or ethyl radical.

The value of g is preferably 1, 2 or 3.

The value of h is preferably 0 or 1.

The organopolysiloxanes (C) which are optionally used preferably have a viscosity of 10 to 1,000,000 mm$^2$/s at 25° C.

Examples of component (C) are the examples indicated for component (A), this organo silicon compound containing no aromatic radicals $R^2$ attached directly to silicon, such as. for instance. polydimethylsiloxanes having viscosities of 100 to 1,000,000 mPa·s at 25° C. These polydimethylsiloxanes may be branched as a result, for example, of the incorporation of $R^5SiO_{3/2}$ or $SiO_{4/2}$ units up to a maximum of 5% of all the units. These branched or partly crosslinked siloxanes then have viscoelastic properties.

Component (C), used optionally, preferably comprises essentially linear organopolysiloxanes containing units of the formula (III), more preferably polydimethyl-siloxanes, which may be terminated with silanol groups and/or with alkoxy groups and/or with trimethylsiloxy groups, or siloxanes containing polyether groups. Polyether-modified polysiloxanes of this kind are known and are described for example in EP-A 1076073.

With particular preference, component (C) comprises organosilicon compounds containing units of the general formula (III) in which $R^5$ is a methyl radical and $R^6$ is a linear and/or branched hydrocarbon radical having at least 6 carbon atoms, h adopts an average value of 0.005 to 0.5 and the sum (g+h) has an average value of 1.9 to 2.1. Products of this kind are obtainable, for example, by alkali-catalyzed condensation of silanol-terminated polydimethylsiloxanes with a viscosity of 50 to 50,000 mPa·s at 25° C. and aliphatic alcohols having more than 6 carbon atoms, such as isotridecyl alcohol, n-octanol, stearyl alcohol, 4-ethylhexadecanol or eicosanol.

If the compositions of the invention include component (C), the amounts involved are preferably 1 to 900 parts by weight, more preferably 2 to 100 parts by weight, in particular 2 to 10 parts by weight, based in each case on 100 parts by weight of component (A).

Component (C) comprises commercially customary products or can be prepared by methods which are commonplace in silicon chemistry.

In addition to components (A), (B) and, where used, (C), the compositions of the invention may comprise all further substances such as have also been used to date in defoamer formulations, such as, for example, water-insoluble organic compounds (D).

The term "water-insoluble" is intended to be understood for the purposes of the present invention as meaning a solubility in water at 25° C. under a pressure of 1013.25 hPa of not more than 2 percent by weight.

Component (D), used optionally, preferably comprises water-insoluble organic compounds having a boiling point greater than 100° C. under the pressure of the surrounding atmosphere, i.e., under 900 to 1100 hPa, and particularly compounds selected from mineral oils, natural oils, isoparaffins, polyisobutylenes, residues from the synthesis of alcohols by the oxo process, esters of low molecular mass synthetic carboxylic acids, fatty acid esters, such as octyl stearate and dodecyl palmitate, for example, fatty alcohols, ethers of low molecular mass alcohols, phthalates, esters of phosphoric acid, and waxes.

The compositions of the invention contain water-insoluble organic compound (D) in amounts of preferably 0 to 1000 parts by weight, more preferably 0 to 100 parts by weight, based in each case on 100 parts by weight of the total weight of components (A), (B) and, where used, (C).

The components used in the process of the invention may in each case comprise one kind of one such component or else a mixture of at least two kinds of each individual component.

The compositions of the invention are preferably compositions which comprise (A) 100 parts by weight of an organosilicon compound comprising units of the formula (I), (B) 0.1 to 30 parts by weight of an additive selected from (B1) filler particles and/or (B2) organopolysiloxane resin made up of units of the formula (II), optionally (C) 1 to 900 parts by weight of organosilicon compounds containing units of the formula (III), and optionally (D) 0 to 10 000 parts by weight of water-insoluble organic compound.

The compositions of the invention are more preferably compositions which are composed of (A) 100 parts by weight of an organosilicon compound made up of units of the formula (I), (B) 0.1 to 30 parts by weight of an additive selected from (B1) filler particles and/or (B2) organopolysiloxane resin made up of units of the formula (II), optionally (C) 1 to 900 parts by weight of organosilicon compounds made up of units of the formula (III), and optionally (D) 0 to 1000 parts by weight of water-insoluble organic compound.

The compositions of the invention are preferably viscous, clear to opaque, colorless to brownish liquids.

The compositions of the invention preferably have a viscosity of 10 to 2,000,000 mPas, in particular of 2,000 to 50,000 mPas, in each case at 25° C.

The compositions of the invention can be solutions, dispersions or powders.

The compositions of the invention can be prepared by known methods, such as by mixing of all the components, for example, employing, for example, high shearing forces in colloid mills, dissolvers or rotor-stator homogenizers. This mixing operation may take place under reduced pressure in order to prevent the incorporation of air which is present, for example, in highly disperse fillers. Subsequently the fillers can be hydrophobicized in situ if required.

Where the compositions of the invention are emulsions it is possible to use all of the emulsifiers that are known to the skilled worker for the preparation of silicone emulsions, such as anionic, cationic or nonionic emulsifiers, for example. Preference is given to using emulsifier mixtures, in which case there ought to be at least one nonionic emulsifier, such as sorbitan fatty acid esters, ethoxylated sorbitan fatty acid esters, ethoxylated fatty acids, ethoxylated linear or branched alcohols having 10 to 20 carbon atoms and/or glycerol esters, for example. In addition it is possible to add compounds known as thickeners, such as polyacrylic acid, polyacrylates, cellulose ethers such as carboxymethylcellulose and hydroxyethylcellulose, natural gums such as xanthan gum, and polyurethanes, and also preservatives and other customary adjuvants known to the skilled worker.

The continuous phase of the emulsions of the invention is preferably water. It is also possible, however, to prepare compositions of the invention in the form of emulsions wherein the continuous phase is formed by components (A), (B) and, where used, (C) or by component (D). The systems involved may also be multiple emulsions.

Methods of preparing silicone emulsions are known. Normally the preparation takes place by simply stirring all of the constituents together and, where appropriate, subsequently homogenizing the system using jet dispersers, rotor-stator homogenizers, colloid mills or high-pressure homogenizers.

Where the composition of the invention comprises emulsions, oil-in-water emulsions containing 5% to 50% by weight of components (A) to (D), 1% to 20% by weight of emulsifiers and thickeners, and 30% to 94% by weight of water are preferred.

The compositions of the invention can also be formulated as free-flowing powders. These are preferred in the context, for example, of application in powder detergents. The preparation of these powders starting from the mixture of components (A), (B), where used (C) and where used (D) takes place in accordance with methods that are known to the skilled worker, such as by spray drying or agglomerated granulation, and using adjuvants known to the skilled worker.

The powders of the invention contain preferably 2% to 20% by weight of components (A) to (D). Examples of carriers employed include zeolites, sodium sulfate, cellulose derivatives, urea, and sugars. Further possible constituents of the powders of the invention include waxes, for example, or organic polymers, as described for example in EP-A 887097 and EP-A 1060778.

The present invention further provides detergents and cleaning products comprising the compositions of the invention.

The compositions of the invention can be used wherever compositions based on organosilicon compounds have been used to date. In particular they can be used as defoamers.

The present invention additionally provides a method of defoaming media and/or of preventing foam therein, which comprises adding the composition of the invention to the medium.

The addition of the composition of the invention to the foaming media can take place directly, in dilution with suitable solvents, such as toluene, xylene, methyl ethyl ketone or t-butanol, for example, as a powder or as an emulsion. The amount needed to obtain the desired defoamer effect is variable and depends for example on the nature of the medium, on the temperature and on the turbulence that arises.

Preferably the compositions of the invention are added in amounts of 0.1 ppm by weight to 1% by weight, in particular in amounts of 1 to 100 ppm by weight, to the foaming medium.

The method of the invention is carried out at temperatures of preferably −10 to +150° C., more preferably 5 to 100° C., under the pressure of the surrounding atmosphere, i.e., about 900 to 1100 hPa. The method of the invention can also be carried out at higher or lower pressures, such as at 3000 to 4000 hPa or 1 to 10 hPa, for instance.

The defoamer compositions of the invention can be used, or the method of the invention carried out, wherever disruptive foam is to be prevented or destroyed. This is the case, for example, in nonaqueous media such as in tar distillation or in petroleum processing, and also in aqueous media. The defoamer compositions of the invention and the method of the invention are particularly suitable for controlling foam in aqueous media, such as in aqueous surfactant systems, for example, such as the use thereof in detergents and cleaning products, the control of foam in wastewater plants, in textile dyeing processes, in the scrubbing of natural gas, in polymer dispersions, or for defoaming aqueous media that are obtained in the production of cellulose.

The compositions of the invention have the advantage that as defoamers they can be easily handled and that they are distinguished by a high, long-lasting effectiveness in a wide variety of different media at low added amounts. This is extremely advantageous from both an economic and an environmental standpoint.

The method of the invention has the advantage that it is easy to implement and highly economical.

In the examples below, all parts and percentages are by weight, unless indicated otherwise. Unless indicated otherwise, the examples below are carried out under the pressure of the surrounding atmosphere, i.e., at about 1000 hPa, and at room temperature, i.e., at about 20° C., or at a temperature which comes about when the reactants are combined at room temperature without additional heating or cooling. All of the viscosity figures quoted in the examples are intended to relate to a temperature of 25° C.

The text below elucidates the structures of the phenylsiloxanes used with $^{29}$Si-NMR data in mol %.

The text below uses the abbreviations Me for methyl radical and Ph for phenyl radical.

Tests of Defoamer Effectiveness

1. Antifoam Index AFI

In an apparatus in accordance with DE-A 25 51 260, 200 ml of a 4% strength by weight aqueous solution of a sodium alkylsulfonate (Mersolat) containing 10 mg of the defoamer under investigation (in solution in 10 times the amount of methyl ethyl ketone) are foamed for 1 minute using two counterrotating stirrers. Subsequently the collapse of the foam is recorded. The area of the plot of foam height versus time is used to calculate the antifoam index. The lower this index, the more effective the defoamer.

2. Stirring Test 300 ml of a solution containing 1% by weight of a defoamer-free washing powder were foamed for 5 minutes with a stirrer at a speed of 1000 revolutions/min. Subsequently 100 µl of a 10% strength by weight solution of the defoamer in methyl ethyl ketone were added and stirring was continued for 25 minutes more. Throughout the time the foam height was recorded.

As a measure of the effectiveness, the average foam height relative to the foam height without defoamer is calculated after 2-3 minutes. The lower the resulting figure, the more effective the defoamer.

3. Washing Machine Test Using Powder Detergents 0.1 g of defoamer was added to 100 g of the defoamer-free washing powder. The washing powder was then introduced together with 3500 g of clean cotton laundry into a drum-type washing machine (Miele Novotronic W918 without Fuzzy Logic). Subsequently the wash program is started (at 30° C.) and the foam height is recorded over a period of 55 minutes. The foam scores (0 no foam measurable to 6 excessive foaming) determined throughout the period are used to determine the average foam score. The lower the score, the more effective the defoamer over the period as a whole.

4. Washing Machine Test Using a Liquid Detergent 0.03 g of defoamer was added to 180 g of a defoamer-free liquid detergent. The detergent was then introduced together with 3500 g of clean cotton laundry into a drum-type washing machine (Miele Novotronic W918 without Fuzzy Logic). Subsequently the wash program is started (at 40° C.) and the foam height is recorded over a period of 55 minutes. The foam scores (0 no foam measurable to 6 excessive foaming) determined throughout the period are used to determine the average foam score. The lower the score, the more effective the defoamer over the period as a whole.

COMPARATIVE EXAMPLE 1 (C1)

A defoamer base is prepared by mixing 2.5 parts of a condensation product having a viscosity of 180 mPas, prepared from octyldodecanol and a polydimethylsiloxane terminated with silanol groups and having a viscosity of 40 mPas, and 5 parts of a 50% strength toluenic solution of a silicone resin comprising 40 mol % trimethylsiloxy groups and 60 mol % $SiO_{4/2}$ groups, and then removing the volatile constituents.

A mixture of 89.3 parts by weight of a trimethylsiloxy-terminated polydimethylsiloxane having a viscosity of 1000 mPas at 25° C. (available from Wacker-Chemie GmbH, Germany under the name "Siliconöl AK 5000"), 5 parts by weight of the abovementioned defoamer base, 5 parts of hydrophilic pyrogenic silica having a BET surface area of 300 m$^2$/g (available from Wacker-Chemie GmbH, Germany under the name HDK® T30) and 0.7 part by weight of a methanolic KOH is heated at 150° C. for 2 h. This gave an antifoam having a viscosity of 25600 mPas. This antifoam was investigated for the antifoam index AFI, in the stirring test and in the washing machine test. The results of these tests are summarized in Table 1.

COMPARATIVE EXAMPLE 2 (C2)

A branched polyorganosiloxane is prepared by the reaction of 378 g of a trimethylsiloxy-terminated polydimethylsiloxane having a viscosity of 1000 mPas at 25° C. (available from Wacker-Chemie GmbH, Germany under the name "Siliconöl AK 1000"), 180 g of a polydimethylsiloxane terminated with silanol groups and having a viscosity of 10000 mPas at 25° C. (available from Wacker-Chemie GmbH, Germany under the name "Polymer FD 10"), and 18 g of ethyl silicate (available from Wacker-Chemie GmbH, Germany under the name "SILIKAT TES 40") in the presence of 0.3 g of KOH by heating at 140° C. Subsequently 30 g of a hydrophilic pyrogenic silica having a BET surface area of 200 m$^2$/g (available from Wacker-Chemie GmbH, Germany under the name HDK® N20) and 30 g of a polydimethylsiloxane terminated with silanol groups and having a viscosity of 40 mPas are added and the mixture is heated at 180° C. for a further 4 h and freed from volatile constituents at 50 hPa. This gave a viscous, colorless defoamer formulation having a viscosity of 68640 mPas.

This antifoam was investigated for the antifoam index AFI, in the stirring test and in the washing machine test. The results of these tests are summarized in Table 1.

COMPARATIVE EXAMPLE 3 (C3)

90 parts of a trimethylsiloxy-terminated diorganopolysiloxane comprising 20 mol % of 2-phenylpropenylmethylsiloxane units and 80 mol % of dodecylmethylsiloxane units and having a viscosity of 1,000 mPas (i.e., containing aromatic groups only in indirectly attached form), 5 parts of a pyrogenic silica having a BET surface area of 300 m$^2$/g, 3 parts of a polydimethylsiloxane containing terminal $C_{20}$ alkoxy groups, 2 parts of a silicone resin which is solid at room temperature and consists of the following units (according to $^{29}$Si-NMR and IR analysis): 40 mol % $CH_3SiO_{1/2}$—, 50 mol % $SiO_{4/2}$—, 8 mol % $C_2H_5OSiO_{3/2}$—, and 2 mol % $HOSiO_{3/2}$—. This resin had a weight-average molar mass of 7900 g/mol (based on polystyrene standard), and 0.7 part of a 20% strength by weight methanolic KOH was mixed with a dissolver and heated at 150° C. for 4 hours. This gave a defoamer having a viscosity of 8000 mPas.

The composition thus obtained was then investigated for the antifoam index AFI, in the stirring test and in the washing machine test. The results of these tests are summarized in Table 1.

EXAMPLE 1

Phenylsiloxane 1 is a silicone oil having a viscosity of 500 mm$^2$/s that according to NMR is composed of the following units:

| | |
|---|---|
| $Me_3SiO_{(1/2)}$ | 9.7% |
| $Me_2SiO_{(2/2)}$ | 64.1% |
| $Ph_2SiO_{(2/2)}$ | 19.6% |
| $PhSiO_{(3/2)}$ | 6.6% |

90 parts of phenylsiloxane 1, 5 parts of a pyrogenic silica having a BET surface area of 300 m$^2$/g (available commercially from Wacker-Chemie GmbH, Germany under the designation HDK® T30), 5 parts of a silicone resin which is solid at room temperature and consists of the following units (according to $^{29}$Si—NMR and IR analysis): 40 mol % $CH_3SiO_{1/2}$—, 50 mol % $SiO_{4/2}$—, 8 mol % $C_2H_5OSiO_{3/2}$—, and 2 mol % $HOSiO_{3/2}$—. This resin had a weight-average molar mass of 7900 g/mol (based on polystyrene standard), and 1.5 parts of a 10% strength by weight KOH in dispersion in polydimethylsiloxane containing trimethylsiloxy end groups and having a viscosity of 1000 mPas are mixed with a dissolver and heated at 150° C. for 4 hours. This gave a defoamer having a viscosity of 28 800 mPas.

The composition thus obtained was then investigated for the antifoam index AFI, in the stirring test and in the washing machine test. The results of these tests are summarized in Table 1.

EXAMPLE 2

Phenylsiloxane 2 is a silicone oil having a viscosity of 200 mm$^2$/s that according to NMR is composed of the following units:

| | |
|---|---|
| $Me_3SiO_{(1/2)}$ | 10.2% |
| $Me_2SiO_{(2/2)}$ | 62.2% |
| $Ph_2Si(OH)O_{(1/2)}$ | 0.7% |
| $PhSi(Me)O_{(2/2)}$ | 7.2% |
| $Ph_2SiO_{(2/2)}$ | 13.8% |
| $PhSi(OH)O_{(2/2)}$ | 1.1% |
| $PhSiO_{(3/2)}$ | 4.8% |

90 parts of phenylsiloxane 2, 5 parts of a pyrogenic silica having a BET surface area of 300 m$^2$/g (available commercially from Wacker-Chemie GmbH, Germany under the designation HDK® T30), 5 parts of the solid silicone resin described in Example 1, and 1.5 parts of a 10% strength by weight KOH in dispersion in polydimethylsiloxane containing trimethylsiloxy end groups and having a viscosity of 1000 mPas are mixed with a dissolver and heated at 150° C. for 4 hours. This gave a defoamer having a viscosity of 15 200 mPas.

The composition thus obtained was then investigated for the antifoam index AFI, in the stirring test and in the washing machine test. The results of these tests are summarized in Table 1.

EXAMPLE 3

Phenylsiloxane 3 is a silicone oil having a viscosity of 1250 mm$^2$/s that according to NMR is composed of the following units:

| | |
|---|---|
| $Me_3SiO_{(1/2)}$ | 2.9% |
| $Me_2SiO_{(2/2)}$ | 34.7% |
| $Me_2Si(OH)O_{(1/2)}$ | 0.4% |
| $PhSi(Me)O_{(2/2)}$ | 61.0% |
| $PhSiO_{(3/2)}$ | 1.0% |

87 parts of phenylsiloxane 3, 5 parts of a pyrogenic silica having a BET surface area of 400 m$^2$/g (available commercially from Wacker-Chemie GmbH, Germany under the designation HDK® T40), 3 parts of a polydimethyl-siloxane containing terminal $C_{20}$ alkoxy groups and having a viscosity of 100 mPas, 5 parts of the solid silicone resin described in Example 1, and 0.7 part of a 20% strength by weight methanolic KOH are mixed with a dissolver and heated at 150° C. for 4 hours. This gave a defoamer having a viscosity of 6400 mPas.

The composition thus obtained was then investigated for the antifoam index AFI, in the stirring test and in the washing machine test. The results of these tests are summarized in Table 1.

EXAMPLE 4

Phenylsiloxane 4 is a silicone oil having a viscosity of 1000 mm$^2$/s that according to NMR is composed of the following units:

| | |
|---|---|
| $Me_3SiO_{(1/2)}$ | 8.8% |
| $Me_2SiO_{(2/2)}$ | 65.3% |
| $Me_2Si(OH)O_{(1/2)}$ | 0.5% |
| $MeSiO_{(3/2)}$ | 1.5% |
| $PhSiO_{(3/2)}$ | 23.9% |

88 parts of phenylsiloxane 4, 2 parts of a pyrogenic silica having a BET surface area of 200 m$^2$/g (available commercially from Wacker-Chemie GmbH, Germany under the designation HDK® N20), 3.6 parts of a polydimethyl-siloxane containing terminal $C_{20}$ alkoxy groups and having a viscosity of 100 mPas and 2.4 parts of the solid silicone resin described in Example 1, and 0.7 part of a 20% strength by weight methanolic KOH are mixed with a dissolver and heated at 150° C. for 4 hours. Subsequently 4 parts of a pretreated precipitated silica, rendered water-repellent using polydimethyl-siloxane and having a BET surface area of 90 g/m$^2$ (available commercially from Degussa AG, Germany under the name SIPERNAT® D10), are incorporated by dispersion using the dissolver. This gave a defoamer having a viscosity of 4000 mPas.

The composition thus obtained was then investigated for the antifoam index AFI, in the stirring test and in the washing machine test. The results of these tests are summarized in Table 1.

EXAMPLE 5

Phenylsiloxane 5 is a silicone oil having a viscosity of 1000 mm$^2$/s that according to NMR is composed of the following units:

| | |
|---|---|
| Me$_3$SiO$_{(1/2)}$ | 7.6% |
| Me$_2$SiO$_{(2/2)}$ | 62.4% |
| Ph$_2$SiO$_{(2/2)}$ | 22.9% |
| PhSi(OH)O$_{(2/2)}$ | 0.3% |
| PhSiO$_{(3/2)}$ | 6.8% |

90 parts of phenylsiloxane 5, 2 parts of a precipitated silica having a BET surface area of 170 m$^2$/g (available commercially from Degussa AG, Germany under the designation Sipernat 383 DS) and 3 parts of a pyrogenic silica having a BET surface area of 300 m$^2$/g (available commercially from Wacker-Chemie GmbH, Germany under the designation HDK® T30), 3 parts of a poly-dimethylsiloxane containing terminal C$_{20}$ alkoxy groups and having a viscosity of 100 mPas, 2 parts of the solid silicone resin described in Example 1, and 0.7 part of a 20% strength by weight methanolic KOH are mixed with a dissolver and heated at 150° C. for 4 hours. This gave a defoamer having a viscosity of 62 000 mPas.

The composition thus obtained was then investigated for the antifoam index AFI, in the stirring test and in the washing machine test. The results of these tests are summarized in Table 1.

EXAMPLE 6

90 parts of phenylsiloxane 3, whose structure is described in Example 3, 2 parts of a pretreated pyrogenic silica, made water-repellent and having a BET surface area of 140 m$^2$/g (available commercially from Wacker-Chemie GmbH, Germany under the designation HDK® H2000), 8 parts of the solid silicone resin described in Example 1, and 1.5 parts of a 10% strength by weight KOH in dispersion in polydimethylsiloxane having a viscosity of 1000 mPas are mixed with a dissolver and heated at 150° C. for 4 hours. This gave a defoamer having a viscosity of 3200 mPas.

The composition thus obtained was then investigated for the antifoam index AFI, in the stirring test and in the washing machine test. The results of these tests are summarized in Table 1.

EXAMPLE 7

90 parts of phenylsiloxane 3, whose structure is described in Example 3, 8 parts of a pretreated pyrogenic silica, made water-repellent and having a BET surface area of 140 m$^2$/g (available commercially from Wacker-Chemie GmbH, Germany under the designation HDK® H2000), 2 parts of the solid silicone resin described in Example 1, and 1.5 parts of a 10% strength by weight KOH in dispersion in polydimethylsiloxane containing trimethylsiloxy end groups and having a viscosity of 1000 mPas are mixed with a dissolver and heated at 150° C. for 4 hours. This gave a defoamer having a viscosity of 25 600 mPas.

The composition thus obtained was then investigated for the antifoam index AFI, in the stirring test and in the washing machine test. The results of these tests are summarized in Table 1.

TABLE 1

| Example | Antifoam index AFI | Stirring test average foam height in % | Washing machine test average foam score |
|---|---|---|---|
| C1 | 682 | 58 | 3.3[1] 4.9[2] |
| C2 | 1612 | 75 | 4.4[1] |
| C3 | 2137 | 91 | 3.2[1] |
| Example 1 | 82 | 41 | 1.9[1] |
| Example 2 | 152 | 52 | 2.7[1] |
| Example 3 | 122 | 50 | 1.0[1] 0.7[2] |
| Example 4 | 135 | 45 | 3.0[1] |
| Example 5 | 62 | 21 | 0.4[1] |
| Example 6 | 212 | 43 | 0.7[1] |
| Example 7 | 337 | 55 | 2.9[1] |

[1]with powder detergent
[2]with liquid detergent

EXAMPLE 8

Testing in Black Liquor:

This test was carried out with emulsions based on the defoamers described in Examples 1 to 7 and in Comparative Examples 1 to 3. These emulsions each contain 20% by weight of silicone defoamer, 10% by weight of a mixture of soybean oil, an ethoxylated isotridecyl alcohol (HLB of 11.2), an ethoxylated stearyl alcohol (HLB 9.7), pentaerythritol distearate, and a polyethersiloxane as emulsifier, and 0.3% by weight of formaldehyde as preservative.

400 ml of black liquor (hardwood, from the processing of birch) were conditioned to 80° C. using a thermostat in a 1 l measuring cylinder with a wash bottle attachment for 15 minutes. After the addition of 20 μl of each defoamer emulsion, the black liquor was pumped in circulation at a rate of 2.3 l/min. A measurement was made of the time t between the start of the test and the time when the foam had risen to 75 mm. The longer this period t, the more effective the defoamer.

TABLE 2

| Example | Black liquor test period t in s |
|---|---|
| C1 | 110 |
| C2 | 80 |
| C3 | 95 |
| Example 1 | 165 |
| Example 2 | 130 |
| Example 3 | 195 |
| Example 4 | 135 |
| Example 5 | 205 |
| Example 6 | 180 |
| Example 7 | 170 |

EXAMPLE 9

90 parts of phenylsiloxane 3, the preparation of which is described in Example 3, 5 parts of a pyrogenic silica having a BET surface area of 400 m$^2$/g (available from Wacker-Chemie GmbH under the designation HDK® T40) and 5 parts of a silicone resin solid at room temperature and consisting of the following units (according to $^{29}$Si NMR and IR analysis): 40 mol % CH$_3$SiO$_{1/2}$, 50 mol % SiO$_{4/2}$, 8 mol % C$_2$H$_5$OSiO$_{3/2}$ and 2 mol % HOSiO$_{3/2}$, with a weight-average molar mass of 7900 g/mol, are heated in the presence of 1500 ppm of KOH at 150° C. for 4 h.

This gives 100 parts of a defoamer formulation. This is mixed at 60° C. with 30 parts of sorbitan monostearate (available under the name "Span 60" from Uniqema) and 20 parts of polyoxyethylene(20) sorbitan monostearates (available under the name "Tween 60" from Uniqema), and diluted gradually with 500 parts of water. 2 parts of a polyacrylic acid (available under the name "Carbopol 934" from BF Goodrich) are added to this mixture and mixed in and a further 345 parts of water and 3 parts of an isothiazolinone-based preservative (available under the name "Acticide MV" from Thor-Chemie Speyer, Germany) are added. Subsequently the emulsion is homogenized at 100 bar using a high-pressure homogenizer and adjusted with 10% strength NaOH to a pH of 6-7.

The defoamer emulsion obtained was outstandingly suitable for defoaming aqueous polymer dispersions.

EXAMPLE 10

90 parts of phenylsiloxane 3, the preparation of which is described in Example 3, 5 parts of a pyrogenic silica having a BET surface area of 400 m²/g (available from Wacker-Chemie GmbH under the designation HDK® T40) and 5 parts of a silicone resin solid at room temperature and consisting of the following units (according to $^{29}$Si NMR and IR analysis): 40 mol % $CH_3SiO_{1/2}$, 50 mol % $SiO_{4/2}$, 8 mol % $C_2H_5OSiO_{3/2}$ and 2 mol % $HOSiO_{3/2}$, with a weight-average molar mass of 7900 g/mol, are heated in the presence of 1500 ppm of KOH at 150° C. for 4 h.

35 ml of a 2% solution of a high molecular mass copolymer of acrylic acid, methacryloyl stearate and pentaerythritol diallyl ether (in a 100:2:0.3 molar ratio) (which, when neutralized, has a viscosity of 17 500 mm²/s) were charged to a glass beaker and, with intensive mixing using a paddle stirrer, 10 g of the abovementioned defoamer formulation were slowly added, so that after 10 minutes' stirring there was an emulsion of the defoamer formulation in the polymer solution. With continued stirring, 88.5 g of light soda were added to this emulsion and subsequently the water was removed under vacuum with continued mixing. Thereafter 0.5 g of a hydrophilic silica having a BET surface area of 200 m²/g (available from Wacker-Chemie GmbH under the name HDK® N20) was mixed in.

This gave a white, free-flowing powder. This powder was used successfully for preventing foam in pulverulent detergents or in pulverulent crop protection concentrates.

The invention claimed is:

1. A defoamer composition, comprising:
   (A) at least one organosilicon compound comprising units of the formula

   $$R_a(R^1O)_bR^2_cSiO_{(4-a-b-c)/2} \quad (I)$$

in which
   R represents a methyl radical,
   $R^1$ each is identical or different and denotes a hydrogen atom or a monovalent, optionally substituted hydrocarbon radical,
   $R^2$ represents a phenyl radical which is attached to the silicon atom via a carbon ring atom,
   a is 0, 1, 2 or 3,
   b is 0, 1, 2 or 3 and
   c is 0, 1, 2 or 3
   with the proviso that the sum a+b+c is less than or equal to 3, and in 1-100% of all units of the formula (I) per molecule, c is other than 0, and in at least 50% of all of the units of the formula (I) in the organosilicon compound the sum a+b+c is 2, and 10 to 100% of SiC-bonded radicals in component (A) are radical $R^2$, (B1) optionally, filler particles, and
   (B2) at least one organopolysiloxane resin comprising units of the formula

   $$R^3_d(R^4O)_eSiO_{(4-d-e)/2} \quad (II)$$

in which
   $R^3$ each is identical or different and denotes a hydrogen atom or a monovalent, optionally substituted, SiC-bonded hydrocarbon radical,
   $R^4$ each is identical or different and denotes a hydrogen atom or a monovalent, optionally substituted hydrocarbon radical,
   d is 0, 1, 2 or 3 and
   e is 0, 1, 2 or 3,
   with the proviso that the sum d+e≦3 and in less than 50% of all of the units of the formula (II) in the organopolysiloxane resin the sum d+e is 2, and, (C) optionally an organosilicon compound comprising units of the formula

   $$R^5_g(R^6O)_hSiO_{(4-g-h)/2} \quad (III)$$

in which
   $R^5$ each is identical or different and has a meaning given for R,
   $R^6$ each is identical or different and has a meaning given for $R^1$,
   g is 0, 1, 2 or 3 and
   h is 0, 1, 2 or 3,
   with the proviso that the sum g+h≦3 and in at least 50% of all of the units of the formula (III) in the organosilicon compound the sum g+h is 2.

2. The composition of claim 1, wherein the organosilicon compounds (A) have a viscosity of 10 to 1,000,000 mPas at 25° C.

3. The composition of claim 1, wherein component (B1) comprises at least one pulverulent filler.

4. The composition of claim 1, wherein component (B2) comprises at least one silicone resin comprising units of the formula (II) wherein in less than 30% of the units in the resin the sum d+e is 2.

5. The composition of claim 1, wherein the composition comprises
   (A) 100 parts by weight of an organosilicon compound comprising units of the formula (I),
   (B) 0.1 to 30 parts by weight of an additive selected from
   (B1) filler particles,
   (B2) organopolysiloxane resin made up of units of the formula (II), or mixtures of (B1) and (B2),
   (C) optionally, 1 to 900 parts by weight of organosilicon compounds containing units of the formula (III), and
   (D) optionally, 0 to 10,000 parts by weight of water-insoluble organic compound.

6. A detergent composition comprising one or more detergents and a composition of claim 1.

7. A method of defoaming a medium, preventing foam therein, or both defoaming and preventing foam therein, comprising adding to the medium, a composition of claim 1.

8. The method of claim 7, wherein the composition is added to the medium in amounts of 0.1 ppm by weight to 1% by weight relative to the weight of the medium.

9. A defoamer composition comprising one or more organosilicon compounds and optionally a filler, wherein the organosilicon compounds consist essentially of:

(A) at least one organosilicon compound comprising units of the formula $$R_a(R^1O)_bR^2{}_cSiO_{(4-a-b-c)/2} \qquad (I)$$

in which
R represents a methyl radical,
R¹ each is identical or different and denotes a hydrogen atom or a monovalent, optionally substituted hydrocarbon radical,
R2 represents a phenyl radical which is attached to the silicon atom via a carbon ring atom,
a is 0, 1, 2 or 3,
b is 0, 1, 2 or 3 and
c is 0, 1, 2 or 3
with the proviso that the sum a+b+c is less than or equal to 3, and in 1-100% of all units of the formula (I) per molecule, c is other than 0, and in at least 50% of all of the units of the formula (I) in the organosilicon compound the sum a+b+c is 2, and 10 to 100% of SiC-bonded radicals in component (A) are radical R²,
(B2) optionally, one or more organopolysiloxane resins comprising units of the formula $$R^3{}_d(R^4O)_eSiO_{(4-d-e)/2} \qquad (II)$$

in which
R³ each is identical or different and denotes a hydrogen atom or a monovalent, optionally substituted, SiC-bonded hydrocarbon radical,
R⁴ each is identical or different and denotes a hydrogen atom or a monovalent, optionally substituted hydrocarbon radical,
d is 0, 1, 2 or 3 and
e is 0, 1, 2 or 3,
with the proviso that the sum d+e≦3 and in less than 50% of all of the units of the formula (II) in the organopolysiloxane resin the sum d+e is 2, and,
(C) optionally an organosilicon compound comprising units of the formula $$R^5{}_g(R^6O)_hSiO_{(4-g-h)/2} \qquad (III)$$

in which
R⁵ each is identical or different and has a meaning given for R,
R⁶ each is identical or different and has a meaning given for R¹,
g is 0, 1, 2 or 3 and
h is 0, 1, 2 or 3,
with the proviso that the sum g+h≦3 and in at least 50% of all of the units of the formula (III) in the organosilicon compound the sum g+h is 2.

10. The composition of claim 9, wherein from 15 mol % to 50 mol % of the SiC bonded radicals in component (A) are radicals R².

11. The composition of claim 9, containing filler particles of silica.

12. The composition of claim 9, wherein at least one organopolysiloxane resin (B2) is present.

13. A defoamer composition comprising one or more organosilicon compounds and optionally a filler, wherein the organosilicon compounds consist essentially of:
(A) at least one organosilicon compound comprising units of the formula $$R_a(R^1O)_bR^2{}_cSiO_{(4-a-b-c)/2} \qquad (I)$$

in which
R represents a methyl radical,
R¹ each is identical or different and denotes a monovalent, optionally substituted hydrocarbon radical,
R² represents a phenyl radical which is attached to the silicon atom via a carbon ring atom,
a is 0, 1, 2 or 3,
b is 0, 1, 2 or 3 and
c is 0, 1, 2 or 3
with the proviso that the sum a+b+c is less than or equal to 3, and in 1-100% of all units of the formula (I) per molecule, c is other than 0, and in at least 50% of all of the units of the formula (I) in the organosilicon compound the sum a+b+c is 2, and 10 to 100% of SiC-bonded radicals in component (A) are radical R²,
(B2) optionally, one or more organopolysiloxane resins comprising units of the formula $$R^3{}_d(R^4O)_eSiO_{(4-d-e)/2} \qquad (II)$$

in which
R³ each is identical or different and denotes a monovalent, optionally substituted, SiC-bonded hydrocarbon radical,
R⁴ each is identical or different and denotes a monovalent, optionally substituted hydrocarbon radical,
d is 0, 1, 2 or 3 and
e is 0, 1, 2 or 3,
with the proviso that the sum d+e≦3 and in less than 50% of all of the units of the formula (II) in the organopolysiloxane resin the sum d+e is 2, and,
(C) optionally an organosilicon compound comprising units of the formula $$R^5{}_g(R^6O)_hSiO_{(4-g-h)/2} \qquad (III)$$

in which
R⁵ each is identical or different and has a meaning given for R,
R⁶ each is identical or different and has a meaning given for R¹,
g is 0, 1, 2 or 3 and
h is 0, 1, 2 or 3,
with the proviso that the sum g+h≦3 and in at least 50% of all of the units of the formula (III) in the organosilicon compound the sum g+h is 2.

14. The composition of claim 13, wherein from 15 mol % to 50 mol % of the SiC bonded radicals in component (A) are radicals R².

15. The composition of claim 13, containing filler particles of silica.

16. The composition of claim 13, wherein at least one organopolysiloxane resin (B2) is present.

* * * * *

UNITED STATES PATENT AND TRADEMARK OFFICE
CERTIFICATE OF CORRECTION

PATENT NO. : 7,619,043 B2  
APPLICATION NO. : 11/570151  
DATED : November 17, 2009  
INVENTOR(S) : Rautschek et al.

It is certified that error appears in the above-identified patent and that said Letters Patent is hereby corrected as shown below:

Column 17, Line 10, Claim 9:

Delete "R2" and insert therefore -- $R^2$ --.

Signed and Sealed this

Ninth Day of February, 2010

David J. Kappos  
*Director of the United States Patent and Trademark Office*